May 5, 1959 K. L. MORTON 2,885,638

APPARATUS FOR FORMING CALIBRATING PULSES

Filed May 17, 1955 3 Sheets-Sheet 1

INVENTOR
K.L.MORTON
BY C. B. Hamilton
ATTORNEY

APPARATUS FOR FORMING CALIBRATING PULSES

Filed May 17, 1955 3 Sheets-Sheet 2

INVENTOR
K. L. MORTON
BY C. B. Hamilton
ATTORNEY

May 5, 1959 K. L. MORTON 2,885,638

APPARATUS FOR FORMING CALIBRATING PULSES

Filed May 17, 1955

3 Sheets-Sheet 3

INVENTOR
K. L. MORTON

BY C. B. Hamilton
ATTORNEY 2,885,638

Patented May 5, 1959

2,885,638

APPARATUS FOR FORMING CALIBRATING PULSES

Kenneth L. Morton, Indianapolis, Ind., assignor to Western Electric Company, Incorporated, New York, N.Y. a corporation of New York Application May 17, 1955, Serial No. 508,880

9 Claims. (Cl. 324—68)

This invention relates to apparatus for forming calibrating pulses, and more particularly to apparatus for forming pulses of known duration to calibrate test sets for measuring pulses of telephone dials.

An object of the invention is to provide apparatus for calibrating telephone dial test sets.

Another object of the invention is to provide apparatus for forming trains of pulses of known duration to calibrate test sets.

An apparatus illustrating certain features of the invention may include an adjustable oscillator for forming pulses of uniform duration and with uniform breaks between the pulses. The pulses actuate an electronic counter, and also are sent to a dial telephone test set to be calibrated. After receiving a predetermined number of pulses, the counter cuts off the pulses to the test set, and then, after a period of time in which to read and reset the test set, reconnects the oscillator to the test set for another test thereof.

A complete understanding of the invention may be obtained from the following detailed description of an apparatus forming a specific embodiment thereof, when read in conjunction with the appended drawings, in which.

Figure 1:
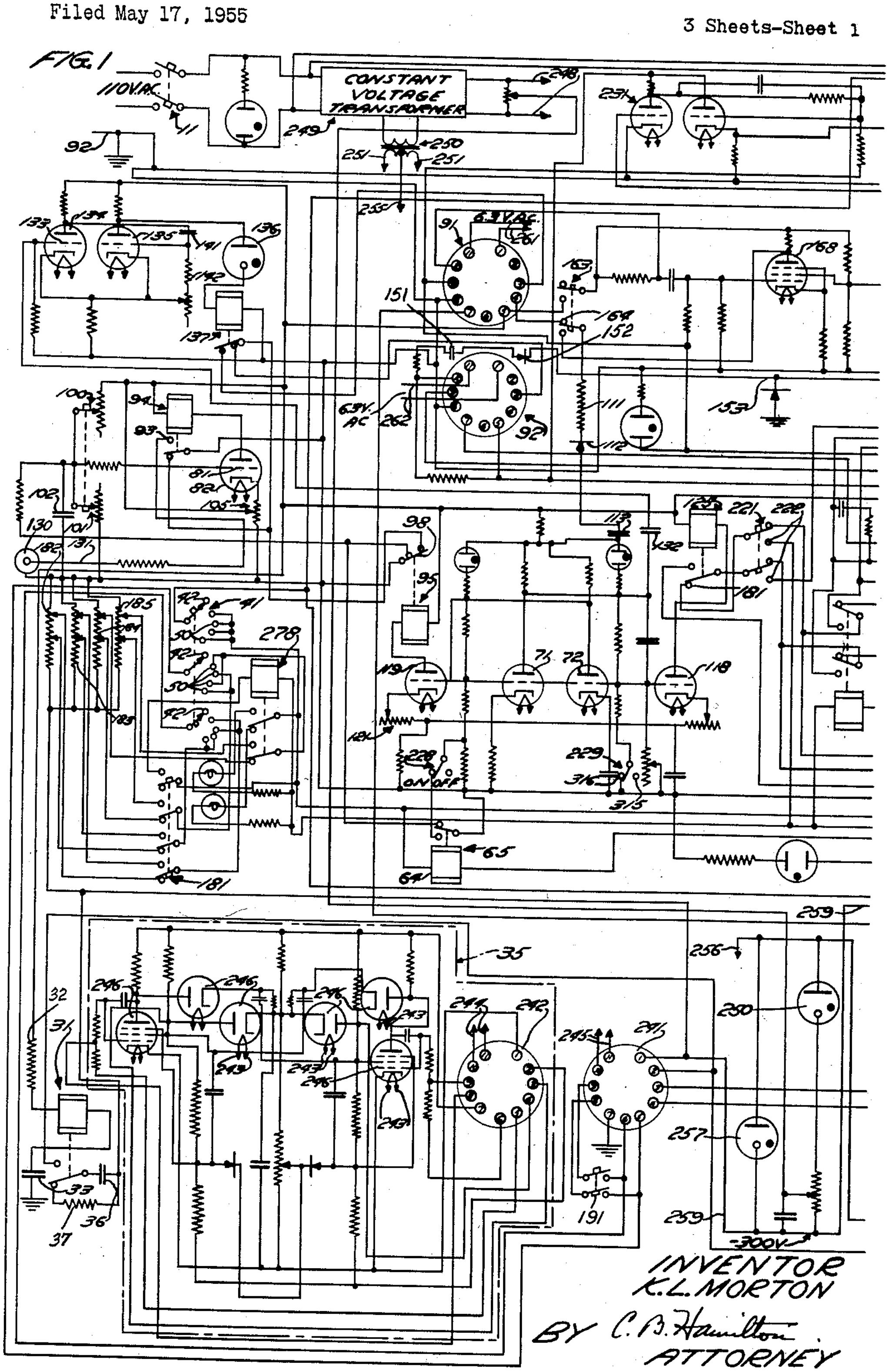
Fig. 1 is a diagrammatic view of a portion of a circuit forming one embodiment of the invention.

Referring now in detail to the drawings, there is shown therein an electronic pulse generator set, which simulates accurately the pulsing contacts of a telephone dial and may be used to calibrate dial test sets used to measure percent break and speed, or "make" time and "break" time of such pulsing contacts. The generator permits the selection of from one to ten pulses in an output sequence with both "make" and "break" time adjustable throughout any desired limits. To calibrate the generator, each output pulse may be measured with a crystal controlled electronic time interval meter 96. The short time stability of the generator is ±0.00004 second per pulse.

When manually operable powerline switches 11 and 12 are closed and a manually operable function switch 14 is placed in an intermediate or testing position, in which contacts 13 are engaged by contactors 15, a time relay 16 delays any application of high voltage power for approximately forty-five seconds. Then the relay 16 closes contacts 17 to a relay 18 to cause a high voltage power supply 19 to supply power to power supply conductors 21, 22, 23 and 24. At the end of the delay, +300 v. A.C. is applied to a relay 31 which is delayed momentarily by a resistor 32 and a capacitor 33 to allow the potentials to be established on oscillator tubes in an oscillator circuit 35 of a well known type. The oscillator 35 is a double-screen-coupled phantastron circuit with catching diodes on the plates, screen grids and suppressor grids, and is adjustable to form pulses of a predetermined duration with breaks of a predetermined duration between the pulses. A suitable circuit for the oscillator 35 is that disclosed in the book "Waveforms," volume 19 of the MIT Radiation Laboratory Series, page 199. When relay 31 operates, a capacitor 36 is placed between −300 v. A.C. and −450 v. A.C. to insert a spike into the oscillator and start the oscillator circuit 35. The capacitor 36 is discharged through a resistor 37 whenever relay 31 is deenergized. The relay 16 keeps the high voltage on the set even though a manually operable range control switch 41 is placed in "standby" or "off" position closing contacts 42. This allows the pulse generator set to be utilized consecutively on several dial sets without having the B+ voltages go off and on. The switch 41 turns on high voltages in the power supply to the oscillator 35 to adjust either or both the make pulse time and the break pulse time in positions closing any of contacts 50 and provides selection of four different make and break times for calibrating purposes. With only contacts 42 closed, the set is in standby condition.

When the range control switch 41 closes contacts 50, a relay 51 is operated and actuates the high voltage relay 18 in the power supply. Contacts 55 on the relay 51 place a positive potential of about 81.5 volts from the junction of resistors 56 and 57 on a grid 58 of a tube 59 to make the tube 59 conductive to operate relay 61 to bridge contacts 60 on the relay 51. Contacts 62 of the relay 61 connect one side of the 48 v. A.C. source to a winding 64 of a relay 65. All normal potentials have now been applied to the pulse-generating set.

Whenever the switch 41 is turned off after calibrating a dial test set, the relay 65 is deenergized to hold the delay timer relay 16 off and put a sequence triggering circuit including tubes 71 and 72 in reset condition. This also deenergizes relay 51, which removes the positive voltage from the grid of tube 59. A capacitor 75 then discharges through a tube 76 and the discharge time is controlled by the negative potential placed on a grid 77 of the tube 76 by a voltage divider 78. When the grid voltage of the tube 59 has dropped to a potential low enough for the tube 59 to cut off, the relay 61 releases, which, in turn, allows the relay 18 to be deenergized, thus turning off the high voltage in the power supply.

As long as the relay 65 is deenergized, the sequence trigger tubes 71 and 72 are held with the tube 71 conducting so that a grid 81 of a vacuum tube 82 is held at approximately ground potential. Electronic decade counters 91 and 92 of a well known type, for example, Berkeley Scientific Model 730 counters, are held in reset by normally open contacts 93 of a relay 94 and because a relay 95 is energized to hold its contacts 98 open. An electronic time interval meter 96 of a well known type is in normal operation when the relay 94 is deenergized. When the relay 65 operates, ground is removed from a grid 81 of the tube 82, but tubes 71 and 119 remain conducting. Any delay of from one to four-and-one-half seconds of the cut-off of the tube 82 is available according to the adjustment of potentiometers 100 and 101. The delay starts when the grid of the tube 82 is removed from ground and a capacitor 102 starts charging through the potentiometer 100. As the capacitor 102 charges, the grid voltage of the tube 82 rises until the cathode voltage set by a potential divider 105 is overcome and the tube 82 conducts. This operates the relay 94 which places the counters 91 and 92 in their normal conditions. The final positive potential of the grid of the tube 82 is fixed by the constant ratio potentiometers 100 and 101. The proper current through the relay 94 is adjusted by the potential divider 105. At the end of the display time delay, the pulses-per-train decade counter 91 counts pulses from the oscillator 35 to the number for which it is set manually and then pulses the sequence trigger stage formed by the tubes 71 and 72, through a resistor 111, a rectifier 112 and a capacitor 113. The decade counter 92 does not operate at this time as there is no input signal. Tubes 72 and 118, which are part of a cathode follower circuit, conduct while the tube 71 and the tube 119 of a cathode follower circuit 121 are cut off. When the tube 118 conducts, a relay 125 operates and removes the shunt from contacts 126 of an output relay 127. The grid of the tube 82 is held near ground which cuts off the tube 82 at this time. The relay 94 is then deenergized which places the time interval meter 96 in normal condition. When the relay 95 is deenergized, a reset lead 131 from a pulse source resets the counters 91 and 92 before the circuit is opened by the relay 94 dropping out.

When the tube 71 was cut off, its abrupt rise in plate voltage was coupled through a capacitor 132 to a grid 133 of a tube 134 to make the tube 134 conductive to cut off a tube 135. The rise in the plate voltage of the tube 135 causes a gas-filled tube 136 to conduct thus energizing a relay 137 momentarily, the time being determined by a capacitor 141 and a potentiometer 142. The counters 91 and 92 are reset to zero and returned to normal by the operation of the relay 137 before the output relay contacts 126 open for the first "break" time. The contacts 126 of the relay 127 pulse the amplifier stage tube 145, which drives the pulse-measured counter 92. With a manually operable switch 147 in "break" position, a positive pulse is applied to a grid 146 of the tube 145 each time the contacts 126 of the relay 127 open. When the switch 147 is set in the "make" position, a positive pulse is applied to the grid 146 of the tube 145 each time the contacts of the relay 127 close. When the counter 92 reaches the number for which it had been set, a positive pulse is applied through a capacitor 151, a rectifier 152 and a "start" lead 153 to the time interval meter 96, which starts the period to be timed. The next operation of the output relay contacts 126 applies a pulse to a "stop" lead 154 connected to the time interval meter 96 to end the timed period, and the meter 96 displays the time, in increments of 10 microseconds, of either a "make" or a "break" time of the output relay contacts 126.

Tubes 160 and 161 are provided and each time the tube 161 is driven into conduction the negative plate voltage signal is applied to the pulses per train counter 91. When the counter 91 reaches the number for which it is set, which determines the number of pulses in a sequence, a negative pulse is applied to the plate circuit of the tube 71, which causes the tubes 72 and 118 to be cut off and the tubes 71 and 119 to conduct. If ten pulses per train are desired for the time interval meter 96, a switch 163 is placed in a position thereof in which contacts 164 thereof are closed and the negative output of the counter 91 triggers the tube 71. If from one to nine, inclusive, pulses per train are desired, a positive pulse from a lead 167 (the number 10 pin) brings a tube 168 into conduction, which in turn applies a negative pulse to the tube 71. The tube 168 is a pulse inverter-amplifier biased to cut off.

As the tube 72 transfers conduction to the tube 71, which also transfers conduction from the cathode follower tube 118 to the cathode follower tube 119, the relay 125 is deenergized, and contacts 181 thereof shunt the output relay contacts 126 to stop the output pulse train. The relay 94 is energized at this time to connect the counters 91 and 92 to the reset lead 131 and place the grid 81 of the display timer tube 82 near ground to start the display time. The cycle may be repeated as outlined above after the relay 65 is again operated.

An interchange of limits of "make" pulses and "break"

pulses is made possible by the switch 41, a manually operable operate-inspect switch 181 and potentiometers 182, 183, 184 and 185. These potentiometers select the proper grid potential for the double screen-coupled phantastron oscillator 35, which in turn, yields the basic timing wave forms or pulses. One potentiometer is required for the make time setting and one for the break time setting for each desired make and break limit. The various combinations of make and break times available may be recorded for use in obtaining the proper limits for calibrating dial sets.

With a speed switch 191 in an open position, the repetition rate or pulse output of the oscillator is variable in the range of ten pulses per second. With the speed switch 191 in a closed position, the mean repetition rate of the oscillator is twenty pulses per second. The electronic counter 91 permits the selection of from one to ten pulses in an output sequence, and may have numbers on selectively depressible buttons thereof corresponding to the numbers on a telephone dial. If the button having the digit "0" is depressed, the generator set will provide a series or train of ten pulses to the counter 96 and an output lead 195 and then remain off for a predetermined time before again recycling automatically.

The relay 94, adjustable by the potentiometers 100 and 101, provides sufficient delay time, adjustable in a range of from one to four-and-one-half seconds, between each train of pulses sent to the lead 95 and the counter 96 to obtain data from the test set (not shown) under test and connected to the output lead 195. The pulse train switch 163 should be set in a position which corresponds to the number of pulses set on the pulses-per-train counter 91. With a switch 201 closed and the function switch 14 closing the next to the top contacts 13, current through the output relay contacts 126 may be set as desired, for example, it may be set at seventy-five milliamperes, supplied thereto by a transformer 206, which simulates the current of a telephone dial when the dial is placed in actual service. When the switch 201 is open, a potentiometer 207 may be adjusted to provide desired current.

With the switch 14 closing contacts 210, a switch 211 and resistors 212 provide a pulse voltage output adjustment from zero to minus 100 volts. A potentiometer 215 provides a fine adjustment for the voltage output. For pulse output measuring, a switch 221 should be in a position closing contacts 222. When the switch 14 closes contacts 225, it connects the output relay 127 to a jack 226, and when the switch 14 closes contacts 13, the output relay contacts 126 are disconnected from the jack 226. A load current from an internal power supply is placed on the contacts and the make and break time may be measured under actual load conditions. When the switch 14 closes "operate" contacts 227, a dial test set may be calibrated and break time may be measured while the set is being used for calibration.

A manual reset switch 228 when opened, will reset the pulse generator. When the switch 228 is closed the timing process is started at the beginning of the display time period, thus eliminating the possibility of starting in the middle of a group of pulses. When a switch 229 is closed, continuous pulsing is obtained at the output by actuating the relay 125, the tubes 72 and 118 being held in the conducting condition. Any one of the pulses in a chosen train or sequence of pulses may be measured with the electronic time interval meter 96. The number of the pulse in a sequence to be measured is set on the electronic counter 92. The make time, break time or total time of any of pulses from one to nine in occurrence may be measured in increments of from 10 to 100 microseconds. The total time and make time of the last or tenth pulse cannot be measured as the tenth make is not completely defined by a succeeding break.

A pulse inverter-amplifier circuit 231 is used to pulse the meter 96 through the lead 154 stop channel when using the pulse output lead 195 to stop the meter 96. That is, the meter 96 is used to calibrate the set, and, alternatively, the pulse output lead 195 is connected to a dial test set to be calibrated by pulses from the pulse generator set.

Figure 2:
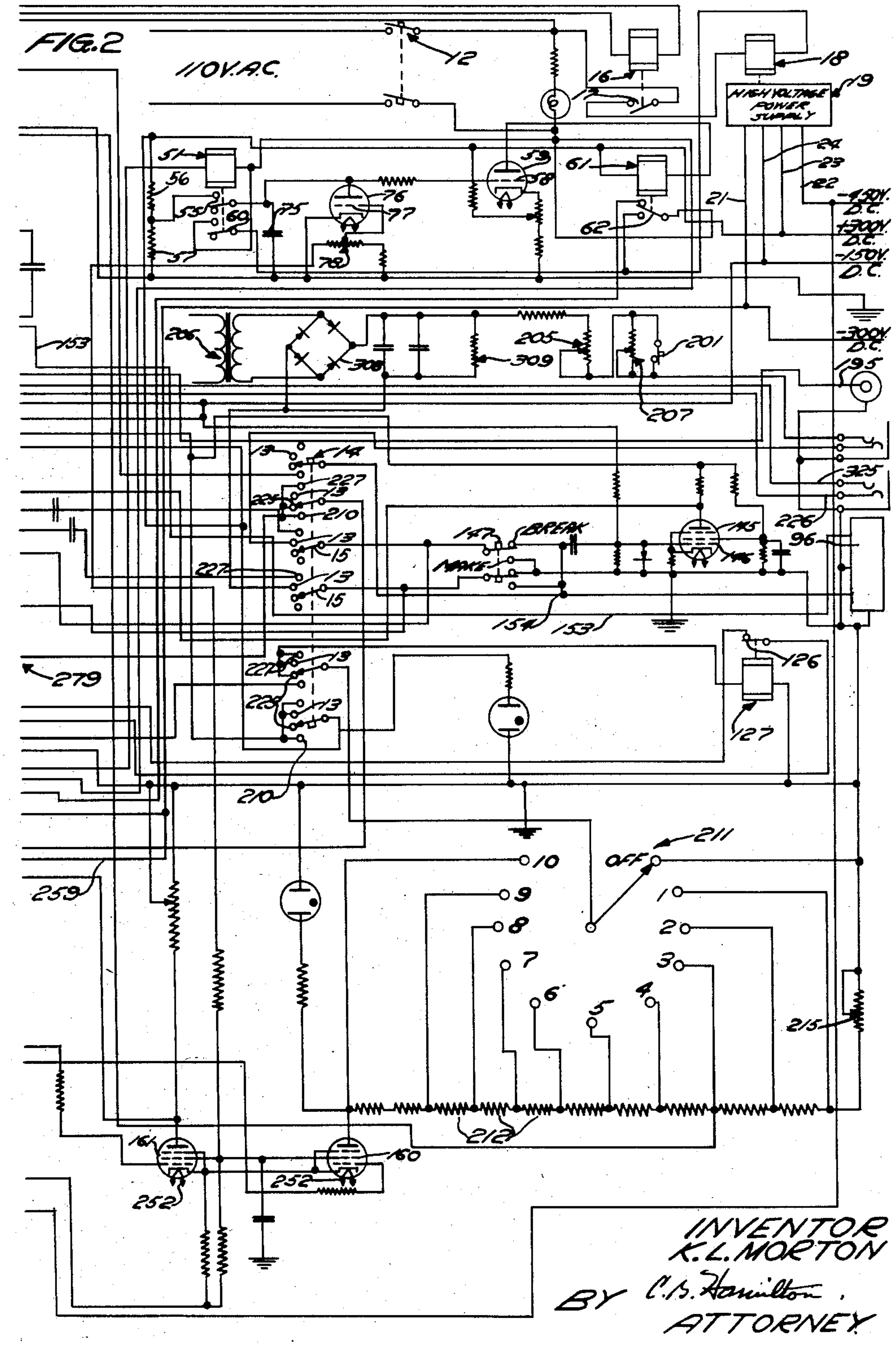
Fig. 2 is a diagrammatic view of the remainder of the circuit, the lefthand edge of Fig. 2 fitting to the righthand edge of Fig. 1.

A plug 241 fits into a socket 242 to connect the leads to the plug to the corresponding numbered leads to the socket. Filament leads 243 of tubes 246 of the oscillator are connected to leads 244 of the socket 242. Leads 245 connected by the plug 241 and socket 242 to the leads 244 are supplied with power from leads 248 of a constant voltage transformer 249. A second transformer 250 supplied by the transformer 249 has filament or heater leads 251 supplying power to filaments 252 of the tubes 160 and 161. A center tap 255 is connected to a lead 256 kept at −150 volts D.C. by gas-filled voltage regulator tubes 257 and 258 connected on the other side thereof to a lead 259 connected to the conductor 21 which is at −300 volts D.C. Filament voltage also is supplied from a suitable source to taps 261 and 262 of the counters 91 and 92, and to the filaments of the other tubes shown in Figs. 1 and 2. A relay 278 is provided to cooperate with the switch 41 and the potentiometers 182 through 185 to adjust the lengths of the pulses from the oscillator 35 and the intervals between the pulses.

Figure 3:
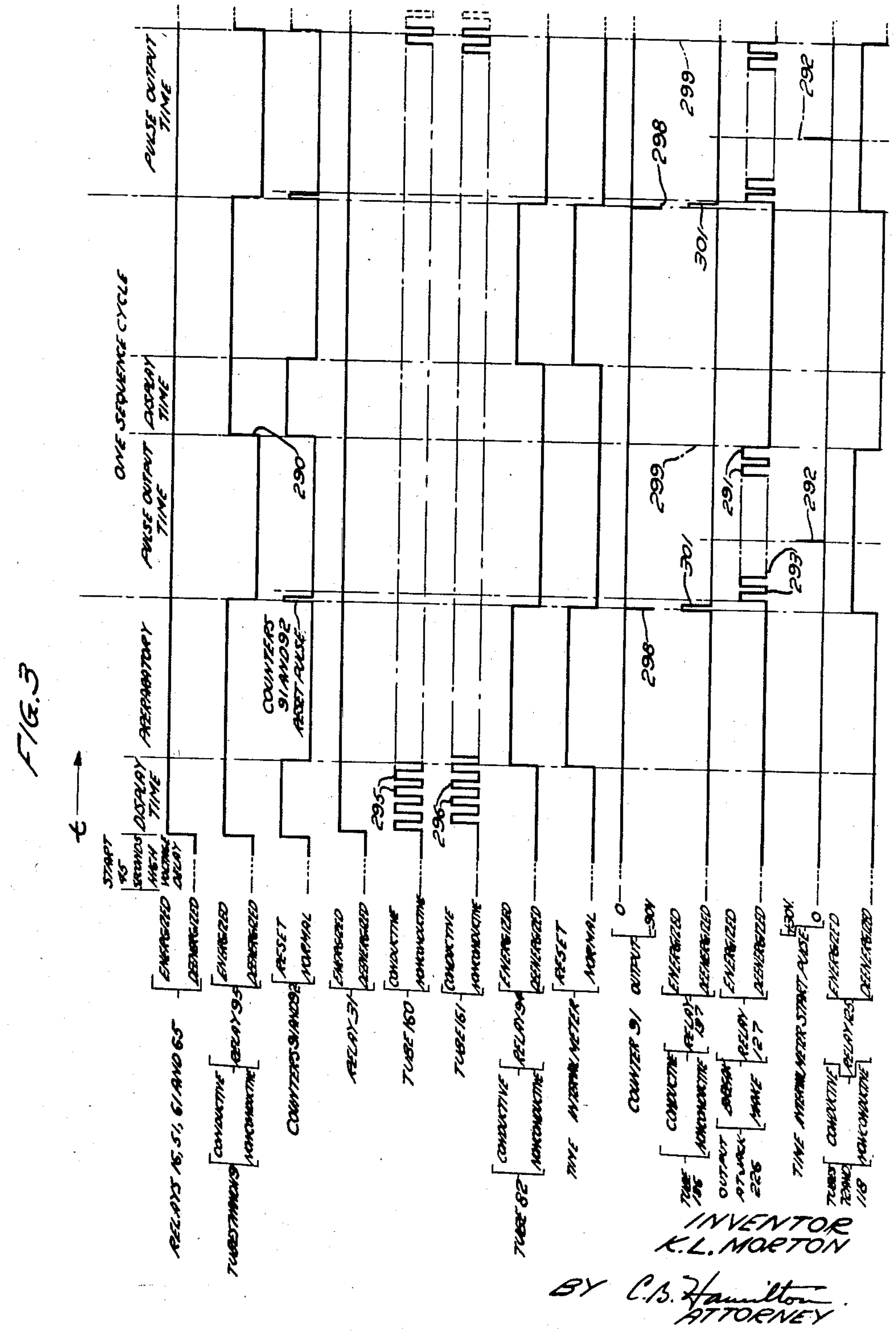
Fig. 3 is a sequence chart of the circuit shown in Figs. 1 and 2.

The chart shown in Fig. 3 illustrates the relative times of operation of the elements of the generator described above with the counter 91 set to produce a pulse 290 at the end of ten output make pulses 291, and the counter 92 set with its number 5 button depressed to cause a pulse 292 to be formed at the start of the fifth output break pulse 291, which is at the end of the fourth complete output make pulse 293. Pulses 295 through the tube 160 corresponding to break time are produced alternately with pulses 296 through the tube 161 corresponding to make time, and these tubes are continuously operated by pulses from the oscillator 35. During calibration or measuring pulses from the generator, by the crystal-controlled time interval meter 96, the tube 82 is conductive to energize the relay 94 during only each period between the display time and the pulse output time so that the meter 96 is returned to normal or measuring condition just at the start of the pulse output time. The output of the counter 91, as determined by its setting is between pulses 298 and 299, which, when the counter 91 is set with its tenth button depressed, occur exactly at the start and at the end of the pulse output time. The relay 137 is energized momentarily by conductivity of the tube 136, and sends a reset pulse 301 from a grounded conductor 302 to the counters 91 and 92 to reset the counters before the first break pulse. The tubes 72 and 118 are conductive during the pulse output time and nonconductive at all other times. Conversely, the tubes 71 and 119 are conductive exclusive of the pulse output time. The relay 127 is operated through the switches 14 and 211 each time by the tube 160 each time the tube 160 is energized, and the output relay 127 opens its contacts 126 each time the relay 127 is operated.

A relay 279 is energized for each position of the switch 14 except when the switch 14 is in a position closing contacts 13, in which position the generator set is designed to send pulses only to the time interval meter 96, to calibrate the generator set, and not to the output lead 195. In this position of the switch 14, the relay 279 transfers the output of the tube 145 from the lead 195 to the meter 96, and also connects the power supply 306 including the transformer 206, a rectifier 308, a network 309 and the elements 201, 205 and 207 to the control circuit of the tube 145 to provide control power to actuate the tube 145 to send pulses to the meter 96.

*Operation*

The function of the generator set is controlled by the position of the switch 14. When the switch 14 closes the contacts 13, the set is in a condition to be calibrated by the time interval meter 96 which will give total break time, total make time or the total of both depending on the setting of the switch 147. When the switch 14 is set closing the contacts 227, output pulses are sent both to the output lead 195 to calibrate dial test sets (not shown) connected thereto and to the meter 96 to monitor the calibration of the dial test set, current from the dial test set itself being utilized to pulse the meter 96.

When the switch 14 closes contacts 225, the generator set is in a position to send a train of precisely measured output pulses to a dial test set connected to the output lead 195, provide the display time for reading the dial test set, go through the resetting or preparatory interval and then send the train again in a repeat testing cycle. When the switch 14 closes contacts 210 and the switch 229 closes contact 315, the generator set is designed to provide continuously occurring, rather than periodic trains of, output pulses to the output lead 195 for operations where such continuously occurring pulses are necessary. For other positions of the switch 14, the switch 229 is kept in a position closing a contact 316. When the switch 14 closes the contacts 210 and the switch 229 closes the contact 316, trains of pulses controlled by the counters 91 and 92 are sent to the output lead 195.

To calibrate a dial test set, the switch 14 is set to close contacts 225, and the switches 11 and 12 are closed. This causes relays 16, 18, 51, 61 and 65 to be actuated after a delay by the relay 16. The relay 31 is energized by the power lead 23 to pulse the oscillator 35 to start it, and it runs continuously with precise pulses thereafter. Meanwhile relay 95 is energized to open its contacts and remove ground from the grid 81 of tube 82. When the capacitor 102 charges up through the circuit including the potentiometers 100 and 101, the tube 82 is conductive and the relay 94 is energized to reset to zero the counters 91 and 92. Then, at the end of the preparatory interval, with the tubes 160 and 161 continuously being made alternately conductive by the oscillator 35, the counter 91 is pulsed the number of times for which it is set and forms the pulse 298, which is negative in the example shown in Fig. 3 because the counter 91 forms a negative pulse 298 for only the setting by its number ten button but positive for one to nine.

The switch 163 being set on the contact 164, though this is time for only the full ten pulse setting of the counter 91, the pulse 298 is inverted and amplified by the tube 168 and pulses the tube 71, which becomes nonconductive and starts the tube 72. The plate voltage of tube 71 rises to pulse the capacitor 132 to make the tube 134 conductive momentarily to cut off tube 135 to fire the tube 136 and energize the relay 137 momentarily. This cuts off ground momentarily from the counters 91 and 92 to reset them. The relay 127 is operated by each pulse from the tube 160 and deenergized each period the tube 160 is deenergized, the tube 160 being continuously alternately energized and deenergized by the oscillator 35. Since the relay 125 is energized through the pulse output time, each energization of the relay 127 to open contacts 126 disconnects output leads 325 and 226 in series with the current in the dial test set to cause a break to appear on the dial test set. Then each time the relay 127 is deenergized, the contacts 126 close to reconnect the dial test set current source to its metering means as a make period.

At the end of the tenth break pulse 291, which is the tenth positive pulse of the tube 161, the counter 91, assumed to have been set with its tenth button depressed, sends a negative pulse 299 to the tube 168 which inverts and amplifies the negative pulse 299 to make the tubes 71 and 119 conductive and the tubes 72 and 118 nonconductive to drop out the relay 125 to shunt the contacts 127 of the output relay 126. The relay 95 is actuated to start the display time, which ends when the capacitor 102 is charged sufficiently to fire the tube 82 and the relay 94. The preparatory interval then starts as described above, and the cycle continues.

The counter 91 also may be set for any desired number of pulses lower than ten, and, if so, produces a positive pulse at the set numbered pulse. For such settings, lower than ten, the switch 163 is moved from closing contacts 164 to shunt the tube 168 and connect the output lead of the counter 91 directly to the tube 71 to end the output of pulses to the dial test set on the pulse of the number for which the counter 91 is set.

To calibrate the pulse generator set itself, the switch 14 is set to close contacts 13, and the relay 279 is deenergized to cut in the power supply 201 to the tube 145 and connect the output relay contacts 126 to the grid of the tube 145 to pulse the tube 145. The switch 147 is set as desired. Then the generator pulses the meter 96, which started by the pulse 292 from the counter 92, which occurs at the pulse, in the pulse output time, of the number for which the counter 92 is set, at the end of the fourth make pulse in the example shown on the chart in Fig. 3. Then the meter 96 is actuated by each make or break pulse until the counter 91 cuts off the pulses to the meter 96, and starts the display time. Since both the counter 91 and the counter 92 may be set as desired any one pulse or group of consecutive pulses from one to nine may be measured by the meter 96.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A generator for supplying pulses to any electrical component to be tested, which comprises free-running oscillator means for producing output pulses, a first tube driven by portions of the pulses of one polarity, a second tube driven by portions of the pulses of the other polarity, a contactor connected to the electrical component, relay means driven by the first tube for opening and closing the contactor, a resettable electronic counter pulsed by the second tube, circuit means operable by the counter after it has been pulsed a predetermined number of times for connecting the contactor to the component, means operable after said number of pulses to the counter for resetting the counter, said circuit means operable by the counter after a further predetermined number of pulses for stopping the output pulses to the component, and means for measuring the duration of the pulses transmitted to the component.

2. A pulse generator set, which comprises free-running oscillator means for producing output pulses, a first tube driven by portions of the output pulses of one polarity, a second tube driven by portions of the output pulses of the other polarity, a contactor connected to the test set, relay means driven by the first tube for opening and closing the contactor, means for cumulatively measuring the duration of pulses received from the oscillator means, electronic counter means pulsed by the second tube for connecting the oscillator means to the measuring means after the counter has been pulsed a predetermined number of times, means for resetting the counter means immediately after it has been pulsed said number of times to start it counting again, means operable after the counter has been pulsed said predetermined number of times again for disconnecting the oscillator means from the measuring means, means then operable for resetting the counter for a predetermined period of time, and means for resetting the measuring means at the end of said period of time.

3. A pulse generator set, which comprises a free-running oscillator for producing square-wave pulses, means for adjusting the oscillator to vary the length of pulses thereof, a first tube driven by the portions of the pulses of one polarity, a second tube driven by the portions of the pulses of the other polarity, output relay means driven by the first tube and having contacts changeable between open and closed on each energization and deenergization of the relay means, second relay means operable when energized to connect the said contacts to a dial test set and when deenergized to block signals from said contacts to said dial test set, and a resettable electronic counter pulsed by the second tube for actuating the second relay means at the start of the test period and for deenergizing the second relay means at the end of a predetermined number of pulses after its start.

4. A pulse generator set, which comprises a free-running oscillator for producing square-wave pulses, means for adjusting the oscillator to vary the length of pulses thereof, a first tube driven by the portions of the pulses of one polarity, a second tube driven by the portions of the pulses of the other polarity, output relay means driven by the first tube and having contacts changeable between open and closed on each energization and deenergization of the relay means, a time interval meter, tube means for actuating the time interval meter when conductive, control means operable by the contacts of the relay means for making the tube means conductive, and a resettable electronic counter pulsed by the second tube for actuating the control means at the start of a test period and for blocking the control means at the end of a predetermined number of pulses after its start.

5. A pulse generator set, which comprises a free-running oscillator for producing square-wave pulses, means for adjusting the oscillator to vary the length of pulses thereof, a first tube driven by the portions of the pulses of one polarity, a second tube driven by the portions of the pulses of the other polarity, output relay means driven by the first tube and having contacts changeable between open and closed on each energization and deenergization of the relay means, a time interval meter, means operable by said contacts for pulsing the time interval meter, second relay means operable when energized to connect the said pulsing means to the meter and when deenergized to block signals from the pulsing means to the meter, an electronic counter pulsed by the second tube for actuating the second relay means at the start of a test period, and a second electronic counter for deenergizing the second relay means at the end of a predetermined number of pulses after the start of a test period.

6. A pulse generator set, which comprises a free-running oscillator for producing square-wave pulses, means for adjusting the oscillator to vary the length of pulses thereof, a first tube driven by the portions of the pulses of one polarity, a second tube driven by the portions of the pulses of the other polarity, a time interval meter, a current source, output relay means driven intermittently by the first tube for connecting the current source to the meter, a first counter operable by pulses from the second tube for blocking pulses from the current source to the meter until the first counter has been actuated a predetermined number of times, and a second counter pulsed by the second tube for blocking pulses from the current source to the meter after the second counter has been pulsed a predetermined number of times.

7. A pulse generator set, which comprises a free-running oscillator for producing pulses, a first tube driven by portions of the output pulses of one polarity, a second tube driven by portions of the output pulses of the other polarity, a current source, a totalizing meter, output relay means driven by the first tube and having a contactor for connecting the current source to the meter, a first counter for blocking the meter from the current source until pulsed by a first predetermined number of pulses from the second tube, a second counter for blocking the meter from the current source after being pulsed a second predetermined number of times by the second tube whereby said meter measures the time interval between said first predetermined number of pulses and said second predetermined number of pulses, and means for starting the counters simultaneously.

8. A pulse generator set, which comprises free-running oscillator means for producing pulses, a time meter, means for pulsing the time meter, a first tube driven by the oscillator for driving the time meter pulsing means, a second tube driven by the oscillator, first counter means operable by a first predetermined number of pulses from the second tube for connecting the pulsing means to the meter, second counter means operable by a second predetermined number of pulses from the second tube for disconnecting the pulsing means from the meter whereby said meter measures the time interval between said first predetermined number of pulses and said second predetermined number of pulses, and means operable a predetermined period of time after the operation of the second counter means for resetting the counters.

9. A pulse generator set, comprising a free running oscillator for producing pulses, means for adjusting the oscillator to vary the duration of said pulses, a first tube driven by the portions of the pulses of one polarity, a second tube driven by the portions of the pulses of the other polarity, a first relay operated by the first tube and having contacts movable between open and closed positions on each energization of the relay, a meter for measuring time intervals, a tube rendered conductive by the closing of said contacts for pulsing the meter, a second relay operable when energized for connecting the meter pulsing tube to said meter and when deenergized to block signals from said tube to said meter, a first resettable electronic counter pulsed by the second tube for energizing the second relay at the start of a test period, a second resettable electronic counter for deenergizing the second relay at the end of a predetermined number of pulses after the start of a test period, circuit means for resetting the electronic counters, and means for resetting the meter at the end of said test period.

References Cited in the file of this patent

UNITED STATES PATENTS

| | | |
|---|---|---|
| 2,250,262 | Matusita | July 22, 1941 |
| 2,403,873 | Mumma | July 9, 1946 |
| 2,418,521 | Morton et al. | Apr. 8, 1947 |

OTHER REFERENCES

Article entitled "Predetermined Counters" by Wild, Electronics, March 1947, pages 120–123.